July 15, 1969
E. M. BURGER
3,455,194
VOLUMETRIC CHECKING DEVICE FOR ELONGATED ELASTOMERIC ARTICLES
Filed Dec. 16, 1966
2 Sheets-Sheet 1
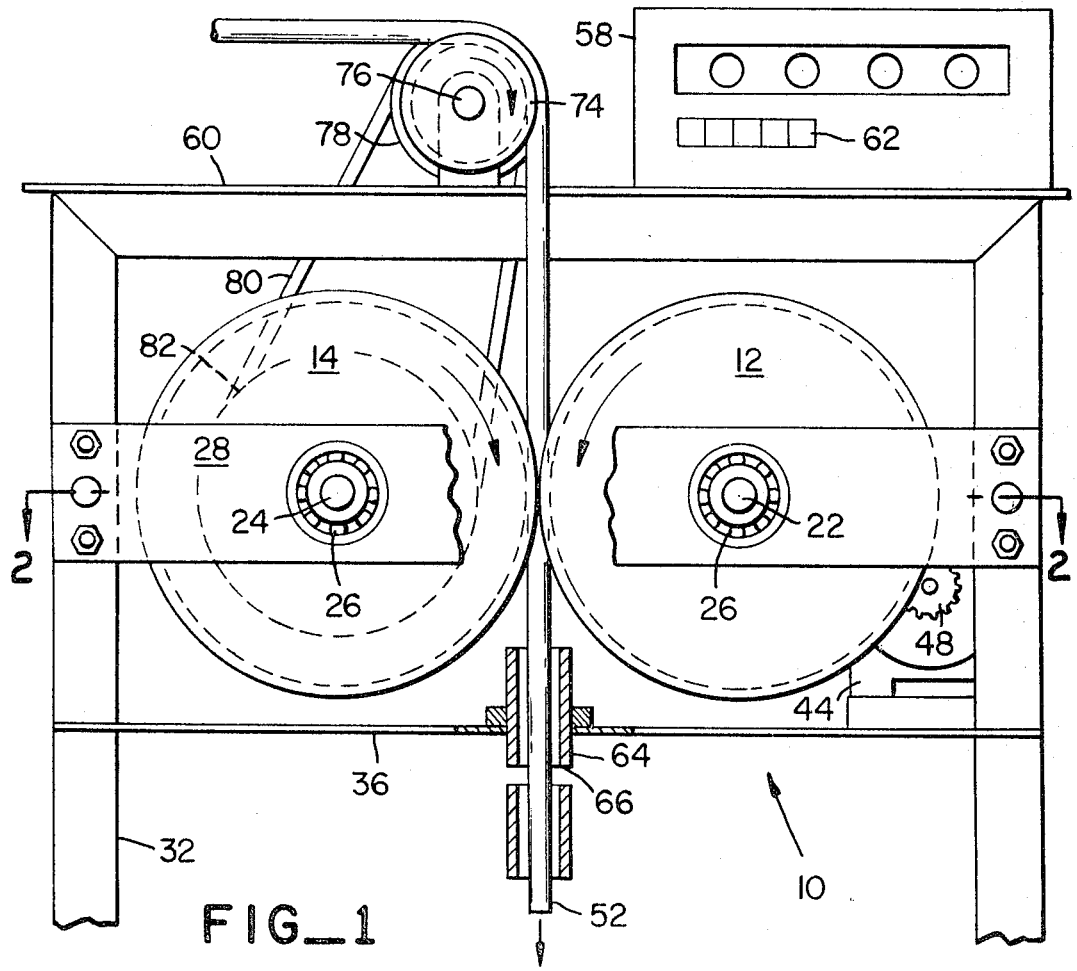
FIG_1
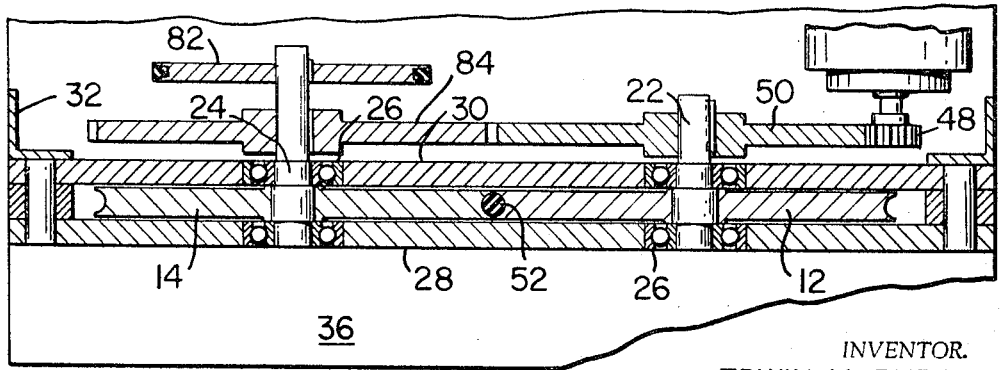
FIG_2
INVENTOR.
EDWIN M. BURGER
BY
Owen, Wickersham & Erickson
ATTORNEYS

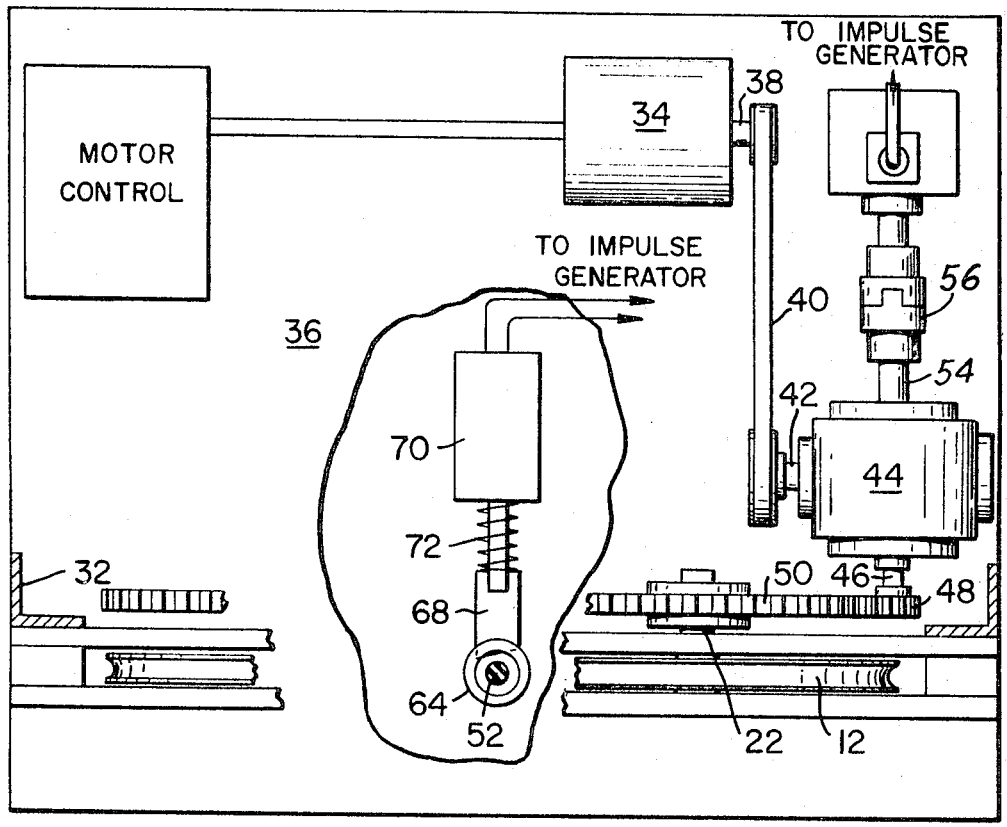
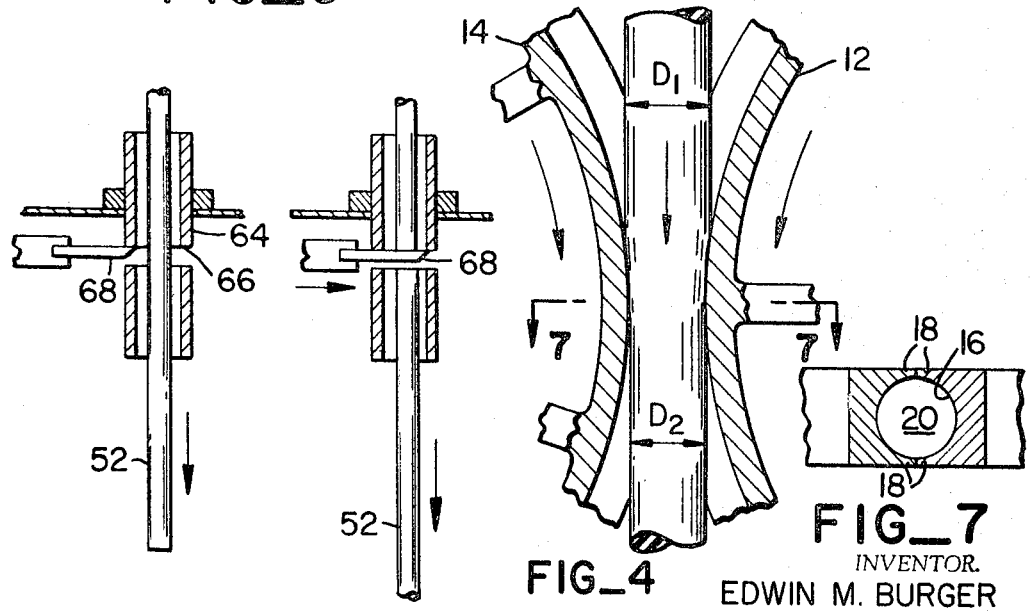

United States Patent Office 3,455,194
Patented July 15, 1969

3,455,194
VOLUMETRIC CHECKING DEVICE FOR ELONGATED ELASTOMERIC ARTICLES
Edwin M. Burger, Walnut Creek, Calif., assignor to Oliver Tire & Rubber Company, Oakland, Calif., a corporation of California
Filed Dec. 16, 1966, Ser. No. 602,343
Int. Cl. B26d 5/26, 5/00, 5/20
U.S. Cl. 83—352                              8 Claims

ABSTRACT OF THE DISCLOSURE

Apparatus for measuring the true volume of elastomeric material in an elongated piece having a slightly variable cross section including a pair of volumizing discs with peripheral grooves spaced apart and rotatable in edge contact to form an opening through which the material is passed, and means for measuring the amount of rotation of at least one disc to determine the true volume of the material.

---

This invention relates to apparatus for measuring or checking the volume of elongated elastomeric articles having a slightly variable cross section.

In manufacturing rubber gaskets for use with bell and spigot concrete pipe and the like, the gasket material is first molded or extruded in a long section. From this section lengths must be cut and then spliced end to end to form the completed circular gaskets. For each size of pipe that provides a specific amount of clearance at its bell and spigot joint, a gasket having a predetermined total volume must be provided for the joint. This volume is a highly critical factor because an excess of rubber will make the pipes difficult to assemble or possibly cause a pipe failure. Yet, if the gasket has an insufficient volume of rubber for the pipe size, improper sealing and possible leakage may result.

When the gasket material is produced, either by molding or extruding, its cross-sectional area even for material having a round cross section may vary somewhat in a random manner along its length. Thus, it is not possible to make a plurality of gaskets of equal volume by merely cutting pieces of gasket material from a coil of stock to the same predetermined length. Prior to the present invention, the determination of volume for pieces of gasket material taken from a roll of stock was made by using the liquid displacement method before the gaskets were spliced together as rings. This was extremely laborious and consumed excessive time and labor, thereby contributing substantially to the manufacturing cost of such gaskets.

The general object of the present invention is to solve the aforesaid problem by providing an apparatus for determining the volume of a length of elastomeric gasket material having generally a constant cross-sectional shape but with slightly variable dimensions; moreover, an apparatus that requires less time and labor to operate and is more accurate in providing a determination of the actual volume of a piece of such elastomeric elongated material.

Another object of the present invention is to provide an apparatus that will receive a continuous supply of elongated elastomeric material having roughly the same cross section and will operate automatically to cut lengths of such material from it that have an equal volume.

A still further object of the present invention is to provide an apparatus of the aforesaid type that is particularly accurate as well as being durable, maintenance-free and easy to set up for automatic operation with a minimum of skilled labor.

A more specific object of the present invention is to provide an apparatus comprised of a pair of wheels or circular discs having circumferential or peripheral indentations forming a measuring chamber that compresses the elastomeric material slightly in a cavity formed between the wheels while the wheels move the material forwardly without any slippage while maintaining its constant cross-sectional area. The amount of rotation of the wheel thereby determines the length of the material passing through the wheels at a constant cross-sectional area, thereby also determining the volume of the material that has passed through the wheels.

Other and further objects of the present invention will be apparent from the following description and claims and are illustrated in the accompanying drawings which, by way of illustration, show a preferred embodiment of the present invention and the principles thereof and what are now considered to be the best mode for applying these principles. Other embodiments of the invention embodying the same or equivalent principles may be made as desired by those skilled in the art without departing from the present invention and the purview of the appended claims.

FIG. 1 is a view in side elevation of a volumizing apparatus embodying the principles of the present invention;

FIG. 2 is a fragmentary view in section taken along the line 2—2 of FIG. 1;

FIG. 3 is a plan view of the apparatus of FIG. 1;

FIG. 4 is an enlarged fragmentary view in section of the apparatus of FIG. 1 showing gasket material as it passes between the volumizing discs;

FIG. 5 is a fragmentary view in section showing the cutoff knife of the apparatus of FIG. 1;

FIG. 6 is a view similar to FIG. 5 showing the knife in the cutoff position;

FIG. 7 is an enlarged view in section taken along the line 7—7 in FIG. 4.

Referring to the drawings, a volumetric checking apparatus 10 embodying the principles of the present invention is shown in FIG. 1. Broadly, it comprises a pair of circular wheels or discs 12 and 14 which are rotatably mounted and positioned side by side with their axes spaced apart so that they engage tangentially as they rotate. These wheels are similar in size and shape and each has an annular recess 16 around its periphery formed by spaced-apart rim portions 18 of equal diameter. As the two wheels rotate both these rim portions engage at one point of contact so that the recesses between them form an opening 20 of a predetermined constant cross section that is perpendicular to a common line of tangency of the two wheels. For example, the peripheral recesses 16, as shown in the drawing for the purpose of describing the invention, are semicircular in cross section, and therefore the opening 20 formed by the two wheels is a circle whose diameter remains constant as the wheels rotate. When the elongated elastomeric material is fed through the opening having generally the same shape as the opening, it is seen that since the diameter of the material is forced to keep constant, the length and hence the volume of the material is directly related to the amount of wheel rotation.

In the apparatus 10, as shown in FIGS. 1–3, the wheels 12 and 14 are mounted on a pair of shafts 22 and 24 both of which are journaled at their opposite ends in roller bearings 26 to provide smooth accurate rotation. The bearings are mounted in a pair of spaced-apart transverse bearing supports 28 and 30 which are bolted to an apparatus frame 32. It is preferable that this structure for supporting the wheels be strong and rigid with the wheel axes parallel so that they will maintain their proper tangential engagement during rotation despite sustained operation wherein material is being fed through the opening 20.

One of the wheels 12 is driven by a suitable means such as a variable speed electric motor 34. In the arrangement shown in FIG. 3, the latter is mounted on a lower platform 36 of the frame 32 and has an output shaft 38 connected by a pulley 40 to the input shaft 42 of a gear box 44 having its own output shaft 46 that rotates at a slower rate than the motor shaft. A pinion gear 48 is fixed to the gear box shaft and meshed with a larger ring gear 50 that is keyed to the shaft 22 of the disc 12. The speed of the motor and thus the speed of the ring gear 50 and the wheel 12 can be varied by means of a conventional motor control unit. The other wheel 14 may be free wheeling or it may be driven so as to rotate at the same rate as the driven disc 12 and thereby help prevent any slippage of the gasket material 52 being volumized by the apparatus.

In order to provide a high degree of accuracy with my apparatus 10, no slippage of the material 52 must occur as it passes through the opening 20 between the volumizing discs. To help prevent any such slippage it is desirable to eliminate any tension on the material 52 as it is being fed between the volumizing discs 12. I overcome this problem by providing a grooved feed wheel 74 located above the disc 14 around which the material being fed is supported. The feed wheel is supported on a shaft 76 to which is also fixed a pulley 78. The latter is connected by a belt 80 to another pulley 82 fixed to the extended end of the disc shaft 24. A gear 84 which is identical to the ring gear 50, is also fixed to the shaft 24 and is driven directly by the ring gear. Thus, with the aforesaid arrangement the feed wheel 74 frictionally engaging the gasket material 52 constantly overcomes any tension on the material which might be produced by a supply reel or the like and instead urges the material forwardly toward the volumizing opening 20 between the discs. Other arrangements may be provided for driving the feed wheel within the scope of the invention, but the one shown has been found to be particularly compact and effective to accomplish the desired result.

Another feature of my invention is that the apparatus 10 provides for completely automatic operation, that is, it can be set up to cut pieces of gasket material to lengths having equal volume from stock which has a variable cross section. In the embodiment of my apparatus shown, a second output shaft 54 of the gear box 44 is connected by a flexible shaft unit 56 to an impulse generator 58 of the well-known type which may be conveniently mounted on an upper platform 60 of the apparatus frame. The generator 58 tabulates the amount of rotation of the wheel 12 directly in digital units, which are displayed on a visual counter 62. It can be set to provide an output signal when a preselected number of digital units have been tabulated which corresponds to a precise amount of wheel rotation and thus to a length of travel of the elastomeric material 52 through the opening 20.

Mounted directly below the opening 20 formed at the junction of the two wheels 12 and 14 is a tubular guide member 64 for the material 52 being volumized having a flat annular surface 66 at its lower end. A movable cutoff knife 68 is mounted on the underside of the lower platform 36 so that it bears against this lower flat end surface 66. The cutoff knife is connected to a solenoid type actuator 70 which is urged in the retracted position by a spring 72.

In reviewing the method employed by the present invention and the operation of the apparatus, it may be recalled that when elongated elastomeric articles are made, such as rubber pipe gasket material, either by a molding or by an extrusion method, the cross-sectional shape of the material will vary somewhat from a nominal dimension. Thus, merely cutting such material in predetermined equal length will not assure that each length has the same correct volume of material which is required for a particular pipe joint.

In the operation of the apparatus 10 according to my invention, the gasket material 52 is fed from a supply reel over the feed wheel 74 through the opening 20 between the wheels 12 and 14 and the tubular guide 64 beneath the opening. The gasket material 52 has a diameter that varies slightly due to irregularities produced during extrusion or molding and is nominally slightly greater than the diameter of the opening 20 formed between the two wheels. Thus, as shown in FIG. 4, the gasket material has a nominal diameter ($D_1$) and is slightly compressed to a smaller diameter ($D_2$) as it passes through the opening. Since the size of the opening never varies, the actual volume of elastomeric material passing through it is directly proportional to the amount of rotation of the discs. The opening is sufficiently smaller than the nominal diameter of the material being volumized so that no significant slippage of the gasket material occurs as it passes through it.

To cut gaskets automatically to lengths having the same predetermined volume with the apparatus 10, the impulse control 58 is first set to a digital figure representing an amount of disc rotation and thus a predetermined desired volume of gasket based on the fixed diameter of the opening 20. Assuming that the end of the gasket material 52 is initially flush with the lower end surface 66 of the guide tube 64, a start button is pushed and the gasket material is drawn by the wheels 12 and 14 through the opening between them in the manner shown in FIG. 4. As the discs or wheels turn, the amount of wheel rotation in the form of impulses is transmitted to the control unit 58 and when the preset digital setting has been reached, an output signal is transmitted to the knife actuator 70. The knife 68 moves across the end of the guide tube 64 and cuts off the gasket material and then retracts. The cycle may commence immediately without further actuation and will repeat until shut off or the supply of gasket material is exhausted.

The lengths of gasket material cut by the apparatus may vary considerably in length due to irregularities in the gasket material when uncompressed, but each piece cut will have the same volume. When spliced together to form pipe gaskets and installed in a slightly stretched condition, they will thus provide the proper amount of uniformly distributed sealing material in the pipe joint.

The apparatus as described provides a rapid and essentially completely automatic volume measurement and cutoff of gasket members. The accuracy as well as the labor saving capacity of my apparatus has caused all prior methods of volume measuring to become obsolete.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A device for measuring the volume of an elongated section of elastomeric material having a substantially uniform but slightly variable cross section, comprising:

a pair of wheels, each having spaced apart peripheral rim portions forming a circumferential recess having a uniform cross section;

unyieldable means for supporting said wheels for rotation about axes which are parallel and spaced apart so that said rim portions of said wheels are constantly tangentially engaged and form an opening as said wheels rotate, said opening having a constant cross section with the same shape but slightly smaller than the smallest cross section of the elastomeric material to be measured;

and means for rotating at least one of said wheels at a predetermined speed as said material is fed through said opening.

2. A device for measuring the volume of an elongated section of elastomeric material having a substantially uniform but slightly variable cross section, comprising:

a pair of wheels, each having outer rim portions forming a circumferential recess between said rim portions having a uniform cross section;

unyieldable means for supporting said wheels for rotation about axes which are parallel and spaced apart so that said rim portions of said wheels are constantly substantially tangentially engaged and form an opening as said wheels rotate, said opening having a constant cross section with the same shape but slightly smaller than the smallest cross section of the elastomeric material to be measured;

means for rotating at least one of said wheels at a predetermined speed as said section of elastomeric material is fed through said opening;

and means for determining the amount of rotation of at least one said wheel and thereby the volume of a section of material passed through said opening.

3. A device for measuring the volume of elongated elastomeric material and for cutting a longitudinal section of such material having a predetermined volume from a longer piece of said material having a slightly variable cross section, comprising:

a pair of wheels, each having spaced apart rim portions forming a circumferential recess with a uniform cross section;

rigid means for supporting said wheels for rotation about axes which are parallel and spaced apart so that said rim portions of said wheels constantly are in tangential engagement as said wheels rotate and form an opening with a constant cross section having the same shape but slightly smaller than the smallest cross section of said elastomeric material being measured;

drive means for rotating at least one of said wheels at a predetermined speed;

means for producing a signal proportional to the amount of rotation of said wheels;

a cutoff knife located adjacent the material that has passed through said opening;

and control means for actuating said cutoff knife to sever said material transversely after a predetermined number of revolutions corresponding to a preselected volume.

4. The device as described in claim 3 wherein said signal producing means comprises an impulse generator providing an electrical impulse for equal increments of wheel rotation and said control means comprises an impulse control unit for producing an output signal for actuating said knife when a predetermined number of impulses have been received.

5. The device as described in claim 3 including a feed means for relieving any tension in the material being volumized before it enters the opening between said wheels.

6. The device as described in claim 5 wherein said feed means comprises a grooved wheel engaging said material; and means connected to said drive means for turning said grooved wheel to urge said material forwardly.

7. A method for measuring the true volume of a section of elongated elastomeric material having a nominal but slightly variable diameter comprising the steps of:

passing the section of elastomeric material through an opening formed by the tangential engagement of spaced apart rim portions of a pair of wheels, said rim portions forming annular recesses on said wheels, whereby said opening maintains a constant size as said wheels turn;

compressing said section of material slightly as it passes through said opening without any substantial slippage;

and measuring the amount of rotation of one of said wheels that occurs as said material passes completely through said opening.

8. The method as described in claim 7 including the additional step of applying an axial force on said material sufficient to overcome any tension on it before it enters the opening between the pair of wheels.

References Cited

UNITED STATES PATENTS

| 827,674 | 7/1906 | Thompson | 83—436 |
|---|---|---|---|
| 2,313,986 | 3/1943 | Brown | 83—350 |
| 3,151,514 | 10/1964 | Noveske | 83—354 |

FOREIGN PATENTS

| 829,947 | 3/1960 | Great Britain. |

ANDREW R. JUHASZ, Primary Examiner

J. F. COAN, Assistant Examiner

U.S. Cl. X.R.

33—132; 73—149; 83—354, 369, 436